United States Patent
Wiatrowski et al.

(10) Patent No.: US 10,764,894 B2
(45) Date of Patent: Sep. 1, 2020

(54) METHOD AND DEVICE FOR ZERO CONFIGURATION DIRECT FALLBACK COMMUNICATION

(71) Applicant: MOTOROLA SOLUTIONS, INC, Chicago, IL (US)

(72) Inventors: David G. Wiatrowski, Woodstock, IL (US); Thomas B. Bohn, McHenry, IL (US); Dipendra M. Chowdhary, Hoffman Estates, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 87 days.

(21) Appl. No.: 16/181,422

(22) Filed: Nov. 6, 2018

(65) Prior Publication Data
US 2020/0146009 A1    May 7, 2020

(51) Int. Cl.
*H04W 72/04* (2009.01)
*H04W 72/02* (2009.01)
*H04W 92/18* (2009.01)

(52) U.S. Cl.
CPC ........ *H04W 72/0453* (2013.01); *H04W 72/02* (2013.01); *H04W 92/18* (2013.01)

(58) Field of Classification Search
CPC .. H04W 72/0453; H04W 72/02; H04W 92/18
See application file for complete search history.

(56) References Cited

U.S. PATENT DOCUMENTS

| | | | |
|---|---|---|---|
| 7,027,408 B2 | 4/2006 | Nabkel et al. | |
| 2011/0231281 A1* | 9/2011 | O'Connor | H04L 63/06 705/26.25 |
| 2014/0114783 A1* | 4/2014 | O'Connor | G06Q 10/08 705/26.1 |
| 2015/0156679 A1* | 6/2015 | Li | H04W 36/0022 370/331 |
| 2017/0041833 A1* | 2/2017 | Li | H04W 8/183 |
| 2017/0150344 A1* | 5/2017 | Li | H04B 1/3816 |
| 2019/0319858 A1* | 10/2019 | Das | H04L 27/2637 |
| 2020/0092720 A1* | 3/2020 | Chin | H04W 60/02 |

OTHER PUBLICATIONS

Intel Corporation: 11 Frame Structure NR unlicensed operation, 3GPP Draft; RI-1609508 Intel NR Unlicensed, 3rd Generation Partnership Project (3GPP) • Mobile Competence Centre; 650, Route Des Lucioles; Sophia-Antipolis Cedex; France ; vol. RAN WGI, No. Lisbon, Portugal; Oct. 10, 2016-Oct. 14, 2016; Oct. 9, 2016 (Oct. 9, 2016) 9 XP051149547—Retrieved from the Internet: URL:http://www.3gpp.brg/ftp/Meetings_3GPP_SYNC/RANI/ Docs/ [retrieved on Oct. 9, 2016], All Pages.

(Continued)

*Primary Examiner* — Ajay Cattungal

(57) ABSTRACT

A method and device for zero configuration direct fallback communication is provided. In one aspect a method comprises selecting a channel in a fallback radio band based on at least a portion of at least one system operating parameter for a primary radio band. The method further comprises switching to the selected channel in the fallback radio band. The method also comprises communicating over the selected channel in the fallback radio band.

17 Claims, 5 Drawing Sheets

(56) References Cited

OTHER PUBLICATIONS

Ericsson: "Channel arrangement for 3.5 GHz", 3GPP Draft; R4-165819, 3RO Generation Partnership Project (3GPP), Mobile Competence Centre; 650, Route Des Lucioles ; F-06921 Sophia-Antipolis Cedex ; France vol. RAN WG4, No. Gothenburg, Sweden: Aug. 22, 2016-Aug. 26, 2016 Aug. 21, 2016 (Aug. 21, 2016), XP051128343, Retrieved from the Internet: URL:http://www.3gpp.org/ftp/Meetings_3GPP_SVNC/RAN4/Docs/ [retrieved on Aug. 21, 2016] the whole document.

Federated Wireless: "CBRS Spectrum Sharing Model in US", 3GPP Draft; RP-151514 CBRS Spectrum Sharing Model in US Clean, 3rd Generation Partnership Project—(3GPP), Mobile Competence Centre: 650, Route Des Lucioles; F-06921 Sophia-Antipolis Cedex ; France vol. TSG RAN, No. Phoenix, AZ; Sep. 14, 2015-Sep. 16, 2015 Sep. 15, 2015 (Sep. 15, 2015), XP051654352. Retrieved from the Internet: URL:http://www.3gpp.org/ftp/tsg%5Fran/TSG%5FRAN/TSGR%5F69/Docs/RP%0151514%2Ezip [retrieved on Sep. 15, 2015] the whole document.

Kyocera: "Possible compromise solution for re-distribution of a fraction of users", 3GPP Draft; R2-154690 MCLD Compromise, 3rd Generation Parfnership Project (3GPP). Mobile Competence Centre; 650, Route Des Lucioles ; F-06921 Sophia-Antipolis Cedex ; France; vol. RAN WG2, no, Malmo, Sweden; Oct. 5, 2015-Oct. 9, 2015 Oct. 4, 2015 (Oct. 4, 2015), XP051005194, Retrieved from the Internet:URL:http://www.3gpp.org/ftp/Meetings 3GPP SYNC/RAN2/Docs/—[retrieved on Oct. 4, 2015], All Pages.

Nokia et al: "Impacts of network sharing", 3GPP Draft; R3-183150 RAN Sharing, 3rd Generation Jartnership Project (3G PP), Mobile Competence Centre; 650, Route Des Lucioles ; F-06921 Sophia-Antipolis Cedex; France vol. RAN WG3, No. Busan, Korea; May 21, 2018-May 25, 2018 May 20, 2018 (May 20, 2018), XP051445634, Retrieved from the Internet: URL:http://www.3gpp.org/ftp/Me!tings%5F3GPP%5FSYNC/RAN3/Docs/ [retrieved on May 20, 2018] pp. 1-4.

The International Search Report and the Written Opinion corresponding patent serial No. PCT/US2019/057976 filed Oct. 25, 2019, dated Jan. 28, 2020, all pages.

* cited by examiner

METHOD AND DEVICE FOR ZERO CONFIGURATION DIRECT FALLBACK COMMUNICATION

BACKGROUND

In the United States, the Federal Communications Commission has recently made radio spectrum in the 3.55-3.7 Gigahertz range available for implementation of the Citizens Broadband Radio Service (CBRS). CBRS spectrum is allocated in a three tiered arraignment. The highest priority tier is the Incumbent Access tier, which generally includes the legacy users of the CBRS band (e.g. federal government users). The next tier is the Priority Access tier in which spectrum is allocated in a competitive bidding process. The third, and lowest priority, tier is the General Authorized Access tier.

Use of spectrum in the CBRS band is authorized via a Spectrum Access System (SAS). When a network infrastructure operator wishes to use spectrum in the CBRS band, an authorization request is sent to the SAS. The SAS then decides, based on various complex factors, if spectrum will be allocated to the requestor. For purposes of this description, the general rule followed by the SAS is if the requested spectrum is not currently being used by a higher tiered user, then the spectrum will be allocated.

For example, a General Authorized Access network operator may request a portion of the CBRS spectrum from the SAS. So long as that portion of the spectrum is not in use by an Incumbent Access tier or Priority Access tier operator, the spectrum will be granted to the requestor. For completeness sake, it should be noted that there are other factors considered (e.g. RF interference) by the SAS when making allocation decisions, but those factors are not of particular relevance to the present disclosure.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
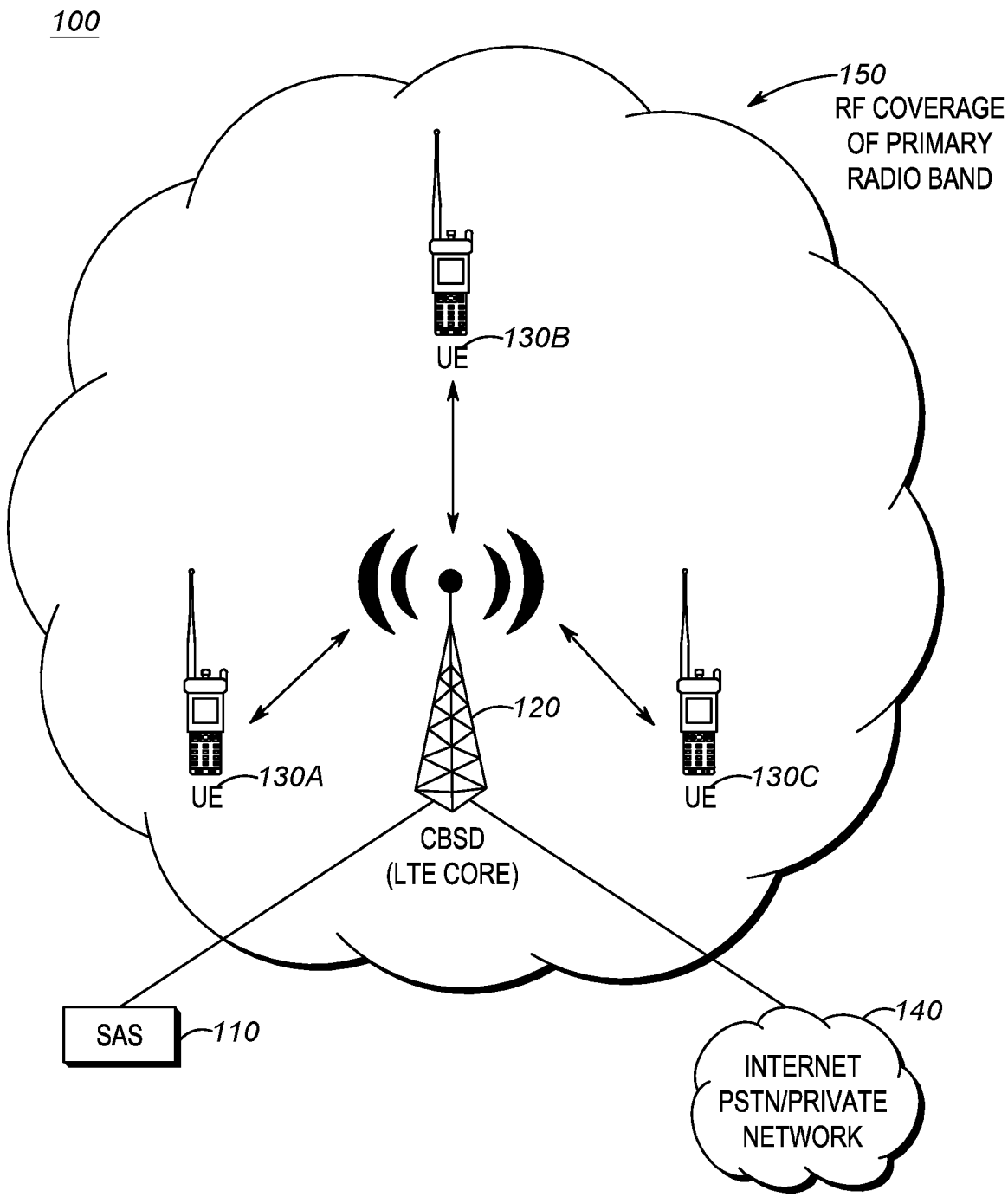
FIG. 1 is an example of an environment in which the zero configuration direct fallback communications techniques may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Incumbent Access users of CBRS spectrum are generally not limited in how they may use the spectrum. Priority Access and General Authorized Access users are required to use allocated spectrum in an infrastructure based system. Infrastructure based meaning that the user will operate a system that includes one or more Citizens Broadband radio Service Devices (CBSD) (e.g. base stations, etc.) that will facilitate communication with User Equipment (UE) (e.g. smartphones, two way radios, etc.). Direct UE to UE communication is not permitted within the CBRS band. Initially, it is expected that the CBRS band will be used to implement Long Term Evolution (LTE) systems and as such the CBSD will form part of an LTE Core. An example of such a system is described with respect to FIG. 1.

A problem arises in the way that CBRS spectrum is managed by the SAS. As mentioned above, in general, the SAS will grant a request for spectrum allocation so long as that spectrum has not already been granted to another operator in a higher priority tier. The problem that arises is that when a higher priority tier operator requests spectrum that has already been allocated to a lower priority tier operator, the lower priority tier operator must release the allocated spectrum. For example, a General Authorized Access tier operator may request 10 Megahertz of spectrum that is currently unused by any other operators. The SAS will likely grant the request and the General Authorized Access tier operator may begin using the spectrum. At a later time, a higher priority tier (e.g. Incumbent or Priority Access) operator may request that same 10 Megahertz of spectrum. The SAS will then revoke the allocation to the General Authorized Access tier operator.

As mentioned above, Priority Access and General Authorized Access operators are required to implement infrastructure based systems. When spectrum allocation is revoked, the CBSD must stop using that spectrum. UE associated with the CBSD are then unable to communicate with the infrastructure which effectively means that the UE will not be able to communicate with each other. As mentioned above, direct UE to UE communication is not permitted in the CBRS band and, as a result, traditional fallback mechanisms, such as using direct UE to UE communications (e.g. LTE ProSe) are not available in the CBRS band.

The techniques described herein provide a method and device for zero configuration direct fallback communication. When a primary radio band (e.g. CBRS) becomes unavailable, a channel is selected in a fallback radio band that permits direct UE to UE communication. The fallback channel, and configuration for operation on the fallback channel, is based on system parameters of the system in the primary radio band. No UE configuration, aside from that which was done when the UE was initially provisioned to operate in the primary radio band, is needed when switching to fallback operation. In other words, when switching to fallback operation, the operator of the UE need not manually reconfigure the UE to operate in the fallback mode. It should be noted that for purposes of this description, manual reconfiguration refers to configuring lower level network access parameters that are needed to communicate in the fallback radio band (e.g. radio frequencies, operating modes, timeslots, etc.). Manual reconfiguration does not include simple user interface steps to change operating mode to the fall back radio band (e.g. toggling a switch, selecting an option form a touch screen interface, etc.).

A method for zero configuration direct fallback communications is provided. The method comprises selecting a channel in a fallback radio band based on at least a portion of at least one system operating parameter for a primary radio band. The method further comprises switching to the selected channel in the fallback radio band. The method also comprises communicating over the selected channel in the fallback radio band.

In one aspect, the method further comprises determining at least a portion of a tracking area code (TAC), determining at least a portion of an International Mobile Subscriber Identity (IMSI) Block Number (IBN), and combining the portion of the TAC and the portion of the IBN to create a Primary System Identifier (PSID). The method further comprises determining a provisioned talk group identifier (TGID). The method further comprises selecting the channel in the fallback radio band based on PSID*TGID.

In one aspect, selecting the channel in the fallback radio band further comprises performing a modulo operation on the PSID*TGID by a number of channels in set value, selecting a channel index based on a remainder determined by the modulo operation on the PSID*TGID, and selecting the channel in the fallback radio band based on the channel index.

In one aspect, the method further comprises performing a modulo operation on the PSID by a number of available color codes, selecting a color code based on a remainder of the modulo operation on the PSID, and communicating on the selected channel using the selected color code. In one aspect, the number of available color codes is 15. In one aspect, the method further comprises mapping the TGID to a valid fallback talk group identifier (FB_TGID). In one aspect, the mapping comprises performing a floor operation on the PSID*TGID divided by the number of channels in set value (FLOOR[PSID/channels in set value]), performing a modulo operation on a result of the floor operation by a number of available fallback talk group identifiers, selecting the FB_TGID based on the remainder of the modulo operation on the result of the floor operation, and communicating on the selected channel, using the selected color code, and using the selected FB_TGID.

In one aspect, the method further comprises selecting a subscriber user identifier (SUID) based on at least a portion of at least one provisioned system operating parameter. In one aspect, selecting the SUID comprises performing a modulo operation on the IMSI by a range of available SUID, and selecting the SUID based on the remainder of the modulo operation on the IMSI.

A device for zero configuration direct fallback communications is provided. The device comprises a wireless transceiver, a processor, and a memory coupled to the processor. The memory contains a set of instructions thereon that when executed by the processor cause the processor to select a channel in a fallback radio band based on at least a portion of at least one system operating parameter for a primary radio band, switch to the selected channel in the fallback radio band, and communicate over the selected channel in the fallback radio band.

In one aspect, the memory further comprises instructions to determine at least a portion of a tracking area code (TAC), determine at least a portion of an International Mobile Subscriber Identity (IMSI) Block Number (IBN), combine the portion of the TAC and the portion of the IBN to create a Primary System Identifier (PSID), determine a provisioned talk group identifier (TGID), and select the channel in the fallback radio band based on PSID*TGID.

In one aspect selecting the channel in the fallback radio band further comprises instructions to perform a modulo operation on the PSID*TGID by a number of channels in set value, select a channel index based on a remainder determined by the modulo operation on the PSID*TGID, and select the channel in the fallback radio band based on the channel index.

In one aspect, the device further comprises instructions to perform a modulo operation on the PSID by a number of available color codes, select a color code based on a remainder of the modulo operation on the PSID, and communicate on the selected channel using the selected color code. In one aspect, the number of available color codes is 15.

In one aspect, the device further comprises instructions to map the TGID to a valid fallback talk group identifier (FB_TGID). In one aspect, the device further comprises instructions to perform a floor operation on the PSID*TGID divided by the number of channels in set value (FLOOR [PSID*TGID/channels in set value]), perform a modulo operation on a result of the floor operation by a number of available fallback talk group identifiers, select the FB_TGID based on the remainder of the modulo operation on the result of the floor operation, and communicate on the selected channel, using the selected color code, and using the selected FB_TGID.

In one aspect, the device further comprises instructions to select a subscriber user identifier (SUID) based on at least a portion of at least one provisioned system operating parameter. In one aspect, selecting the SUID comprises instructions to perform a modulo operation on the IMSI by a range of available SUID and select the SUID based on the remainder of the modulo operation on the IMSI.

A non-transitory processor readable medium for zero configuration direct fallback communications is provided. The non-transitory processor readable medium contains a set of instructions thereon that when executed by the processor cause the processor to select a channel in a fallback radio band based on at least a portion of at least one system operating parameter for a primary radio band, switch to the selected channel in the fallback radio band, and communicate over the selected channel in the fallback radio band.

In one aspect, the medium further comprises instructions to determine at least a portion of a tracking area code (TAC), determine at least a portion of an International Mobile Subscriber Identity (IMSI) Block Number (IBN), combine the portion of the TAC and the portion of the IBN to create a Primary System Identifier (PSID), determine a provisioned talk group identifier (TGID), and select the channel in the fallback radio band based on PSID*TGID.

Although the above description was presented in terms of the SAS revoking a spectrum allocation, it should be understood that the techniques described herein are applicable whenever UE are unable to communicate with the infrastructure for any reason (e.g. infrastructure hardware failure, infrastructure losing connection to SAS, infrastructure power failure, UE roams outside coverage are of LTE system, etc.). Furthermore, although described in terms of CBRS, it should be understood that the techniques described herein are applicable whenever a zero configuration fallback UE to UE direct communication mechanism is required due to infrastructure no longer being available. For example, in any case where the primary radio band does not permit direct UE to UE communication within the primary radio band.

FIG. 1 is an example of an environment in which the zero configuration direct fallback communications techniques may be implemented. The environment 100 includes SAS 110, CBSD 120, and UE 130A-C (collectively UE 130). Environment 100 may also include a backhaul connection from the CBSD to various networks 140.

As mentioned above, the SAS 110 may be responsible for receiving requests for CBRS spectrum and based on various factors, including if the spectrum is currently in use, may grant the request for spectrum. In addition, the SAS may arbitrate conflicting requests for spectrum in the CBRS band. In some cases, the SAS may revoke a previous spectrum grant in order to grant that spectrum to a higher priority access tier user. It should be understood that although only a single SAS is depicted, there may be any number of SAS. In some cases, SAS may be deployed geographically to handle spectrum allocation in a defined geographical area. Furthermore, redundant SAS may be provided for backup purposes.

The CBSD 120 may include infrastructure devices, such as base stations, that allow a user to establish a CBRS wireless network. It is expected that initially, CBRS network will be based on LTE, however it is expected that as technology advances, other wireless networks would also be usable. What should be understood is that the CBSD equipment is used in an infrastructure based wireless network. Direct communication between UEs is not allowed permitted. Although only a single CBSD is depicted it should be understood that a CBRS network may include any number and any type of infrastructure. CBSD 120 is being used to simply represent the network infrastructure.

The environment 100 may also include UE 130A-C. UE may be any type of radio device that includes a wireless transceiver. For example, UE may include devices such as half duplex Push to Talk (PTT) walkie talkie devices. UE may also include devices such as LTE smartphones, tablets, phablets, computers, or any other device including a wireless transceiver. The techniques described herein are applicable to any UE that is capable of communicating with wireless network infrastructure equipment over a primary radio band while also being capable of at least voice communication directly with other UE over a fallback radio band.

The CBSD 120 infrastructure equipment may be connected via a link to any number of other networks 140. For example, such networks could include the Internet, private intranets, the Public Switched Telephone Network (PSTN), P25 networks, Tetra networks, other LTE networks, or any other type of network. Such connections may allow UE 130 to communicate with devices outside of the CBRS network.

In operation, CBSD 120 may request spectrum in the CBRS band for use in setting up a wireless network in a primary radio band. Based on defined rules, the SAS may grant the spectrum request. The CBSD may then establish a wireless network 150 using the primary radio band. UE 130A-C may communicate wirelessly with the CBSD infrastructure equipment. The infrastructure equipment may the relay those communications to other UE within the wireless network 150 or may utilize the connection to other networks 140 in order to enable communication with devices outside of wireless network 150. What should be understood is that during normal operation, wireless communication is from the UE to the CBSD. Direct UE to UE communication is not permitted.

Figure 2:
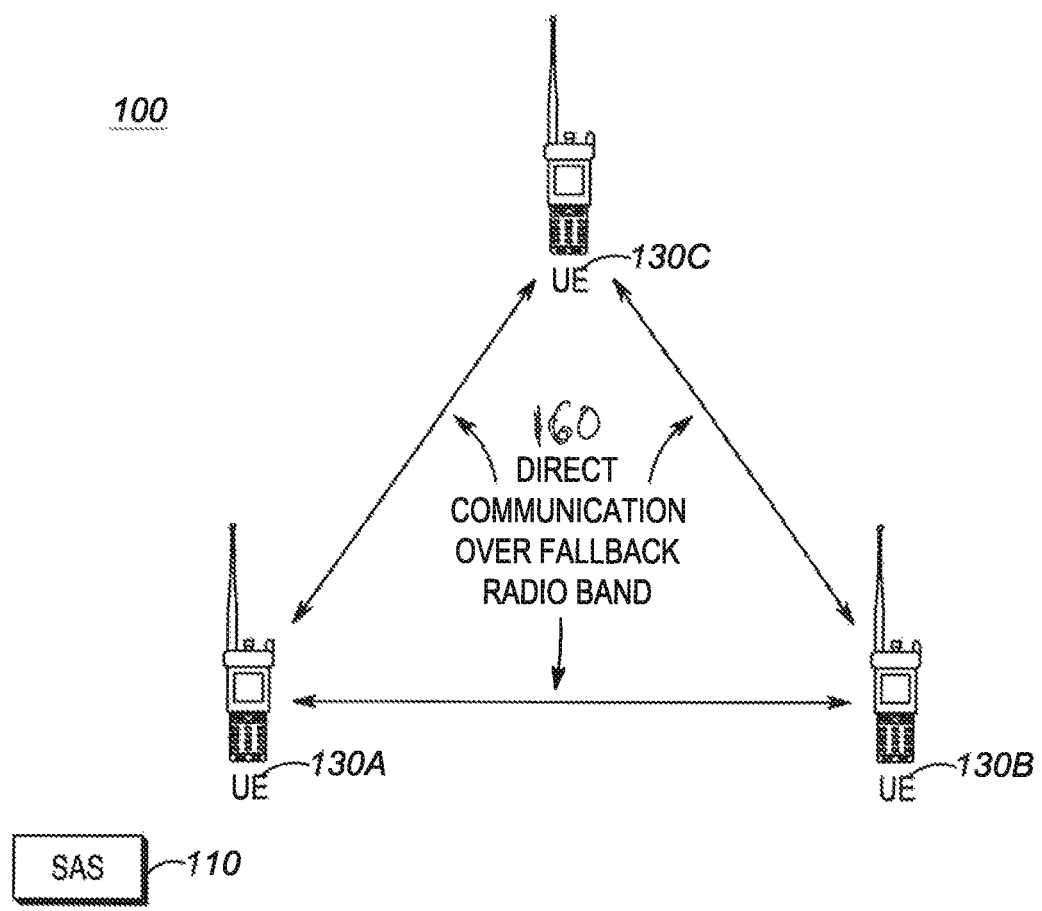
FIG. 2 is an example of an environment in which communication is being provided using the zero configuration direct fallback communications techniques described herein.

FIG. 2 is an example of an environment in which communication is being provided using the zero configuration direct fallback communications techniques described herein. As mentioned above, the SAS 110 may revoke the grant of CBRS spectrum at any time. In addition, CBSD 120 infrastructure equipment may also fail (e.g. hardware failure, software failure, power outage, etc.). Regardless of the specific reason, the infrastructure based communication by UE 130 over the primary radio band may no longer be possible. As mentioned above, direct UE to UE communication in the primary band may not be allowed.

The techniques described herein allow for direct UE to UE communication (for at least voice) in a fallback radio band. As shown, each of UE 130 may communicate directly with all other UE via fallback radio band 160. When switching from the primary band to the fall back band, users of UE130 do not need to reconfigure their device. All operating parameters necessary to switch to and operate in the fallback radio band is either provided at the time the UE was initially configured to work in the primary band (e.g. at initial provisioning) or can be derived from the operating parameters in effect in the primary band immediately prior to the switch to the fallback radio band.

It should further be understood that although the description herein is presented in terms of a CBRS network, the techniques described are applicable in any system where use of the primary radio band may not always be available (e.g. due to spectrum revocation, hardware failure, software failure, etc.) and direct UE to UE communication is not possible in the primary radio band.

Figure 3:
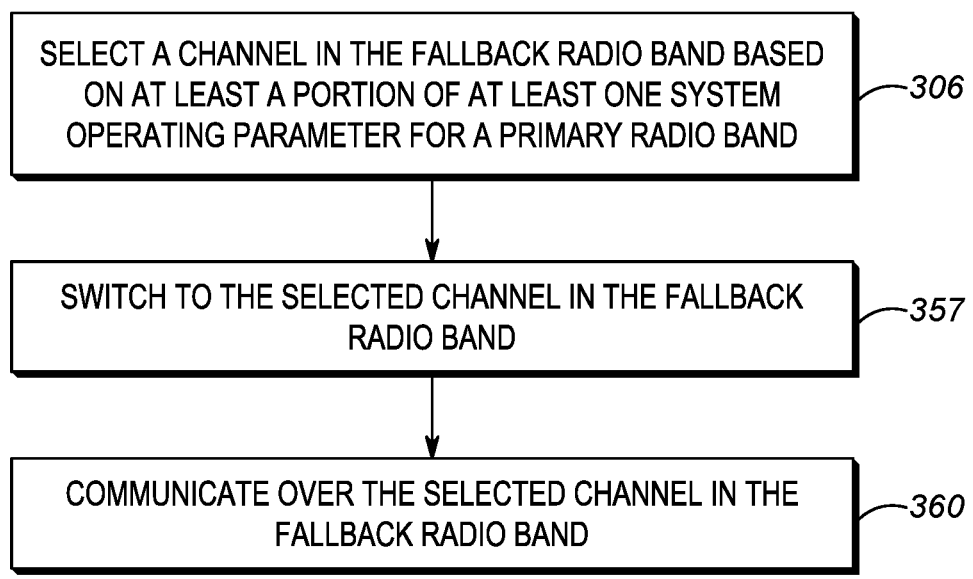
FIG. 3 is an example flowchart of a method for implementing the zero configuration direct fallback communications techniques described herein.

FIG. 3 is an example flowchart of a method for implementing the zero configuration direct fallback communications techniques described herein. As explained above, the primary radio band, such as a CBRS band, may become unavailable for any number of reasons (e.g. SAS revokes the allocation, hardware failure of CBSD, etc.). The primary radio band may become unavailable because the UE has roamed outside the coverage are of network 150. In other cases, the user may manually decide he wishes to no longer use the primary radio band. The specific reason why the switch to the fallback radio band is desired is unimportant. What should be understood is that communication in the fallback radio band is desired.

As mentioned the techniques described herein allow for switching to a fallback radio band with no reconfiguration required by the user at the time of switching. However, initial configuration may be required at the time of system/UE provisioning. For example, radio spectrum in a band that permits direct UE to UE communication may be acquired for use as the fallback radio band. For example, one such band is the Industrial/Business Pool (IBP) radio band that is authorized under C.F.R. Title 37 Part 90 § 90.267. The IBP radio band is a lightly regulated radio band that permits direct UE to UE communications. The operator of wireless network 150 may determine, through RF planning techniques, the number of channels in the IBP band that may be required to support the expected number of UE operating within the wireless network if it should become necessary for those UE to switch to the fallback radio band. The operator may then request licenses for the determined number of channels from the regulating body. In the case of the United States, the regulating body would be the Federal Communications Commission (FCC).

The FCC may then provide the network operator with a list of channels that it is authorized to use. That list of channels may be stored in the UE at the time the UE is initially provisioned for use with wireless network 150.

Such a list is depicted in Table 1. As shown, the table includes a channel index, which is a logical channel number that may be used in the channel selection process, as will be described in further detail with respect to FIG. 4. The total number of channel indexes (e.g. 12 as shown in Table 1) may be referred to as the channels in set (Channels_In_Set) value. The table may also include IBP physical channel numbers, which are the physical channel numbers granted by the FCC. The table also may include a frequency, which is the RF frequency assigned to the IBP physical channel number. It should be noted that in the IBP band, the frequency may be determined using the formula:

$$\text{frequency}=0.003125*IBP \text{ Physical Channel Number}+450 \text{ MHz} \quad (\text{eq1})$$

and as such, it may be possible to omit the frequency information from the UE by including eq1. It should further be noted that this may not be the case for radio bands other than the IBP band.

The table may also include the operating mode. In the IBP band two operating modes are specified, a 12.5 kHz analog mode and a 6.25 kHz equivalent Time Division Multiple Access (TDMA) digital mode. The 6.25 kHz equivalent mode is actually a mode that operates at 12.5 kHz, but is divided into two time slots, resulting in an effective bandwidth that is equivalent to running at 6.25 kHz on each timeslot. In the case where the operating mode of a channel is 6.25 kHz equivalent, the channel has a timeslot (either 0 or 1) specified.

TABLE 1

Example IBP Authorized Channel List

| Channel Index | IBP Physical Channel Number | Frequency (MHz) | Operating Mode (kHz) | Timeslot |
|---|---|---|---|---|
| 0 | 508 | 451.58750 | 12.5 | n/a |
| 1 | 2108 | 456.58750 | 12.5 | n/a |
| 2 | 650 | 452.03125 | 12.5 | n/a |
| 3 | 2300 | 457.18750 | 12.5 | n/a |
| 4 | 422 | 451.31875 | 6.25e | 0 |
| 5 | 422 | 451.31875 | 6.25e | 1 |
| 6 | 2022 | 456.31875 | 6.25e | 0 |
| 7 | 2022 | 456.31875 | 6.25e | 1 |
| 8 | 866 | 452.70625 | 6.25e | 0 |
| 9 | 866 | 452.70625 | 6.25e | 1 |
| 10 | 5586 | 467.45625 | 6.25e | 0 |
| 11 | 5586 | 467.45625 | 6.25e | 1 |

In block 306, a channel in the fallback radio band may be selected based on at least a portion of at least one system operating parameter for a primary radio band. As will be discussed in further detail below, the wireless network may have operating parameters that are provisioned into the UE or are received over the air as part of the process of the UE connecting to the CBSD. For example, such parameters can include a Tracking Area Code (TAC), which is a 16 bit long code that is uniquely assigned by network operators for each area in which service is provided and is received over the air by UE when connecting to the CBSD.

Another example of system operating parameter is an International Mobile Subscriber Identity (IMSI) Block Number (IBN). An IMSI may generally be a 15 digit character string which is represented using 64 bits. The IBN may be a 4 digit portion of a UE's full 15 digit IMSI and is assigned to each UE at the time of provisioning the UE. Although a TAC and IBN have been mentioned as system operating parameters, it should be understood that any number of other system operating parameters are available. The techniques described herein are not limited to any specifically mentioned operating parameters.

In block 357, a switch to the selected channel in the fallback radio band may occur. Once the channel in the fallback band is selected (e.g. from one of the available channels shown in Table 1), the UE may then switch from using the primary radio band to the selected channel (and corresponding operating mode) in the fallback radio band.

In block 360, the selected channel in the fallback radio band may be used to communicate. In other words, the selected channel in the fallback radio band may be used to permit direct UE to UE communication as was described with respect to FIG. 2. At minimum, such communication may consist of half duplex voice communication. However, the techniques described herein are not so limited. Any direct UE to UE communications mode that is permitted in the fallback radio band (e.g. full duplex voice, data communications) may be utilized.

Figure 4:
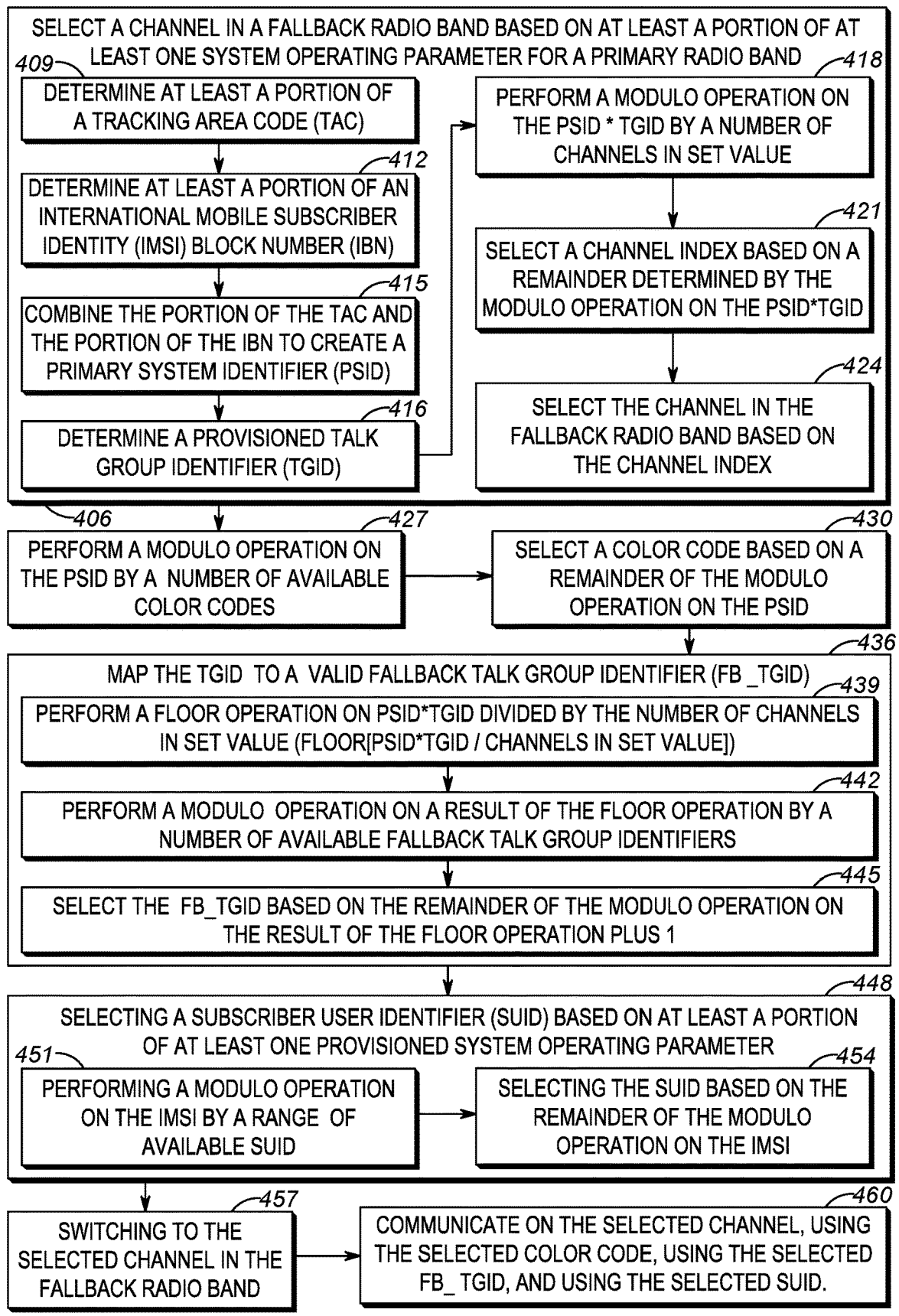
FIG. 4 is an example flowchart of a more detailed method for implementing the zero configuration direct fallback communications techniques described herein.

FIG. 4 is an example flowchart of a more detailed method for implementing the zero configuration direct fallback communications techniques described herein. In block 406, as in block 306, a channel in the fallback radio band may be selected based on at least a portion of at least one system operating parameter for a primary radio band. A more detailed description of the selection process is described below, with respect to blocks 409-424.

In block 409, at least a portion of a TAC may be determined. As mentioned above, the TAC may be a 16 bit number that is utilized to identify a wireless network. In one implementation, a portion of the TAC (e.g. 9 bits of the TAC) may be determined. In block 412 at least a portion of an IBN may be determined. As mentioned above an IMSI may be a 15 digit number represented using 64 bits. The IBN may be represented by 4 digits of the 15 digit IMSI. A certain number of bits of the representation of the IBN (e.g. 7 bits of the IBN) may be determined.

In block 415, the portion of the TAC and the portion of the IBN may be combined to create a Primary System Identifier (PSID). For example, the determined 9 bits of the TAC may be combined with the determined 7 bits of the IBN to form a 16 bit PSID. It should be understood that the described combination of TAC and IBN into a single 16 bit number to create a PSID is only one possible implementation. The PSID may be any number of bits long, and may be created by any number of combinations of any system operating parameters. What should be understood is that the PSID is any number that may identify the particular wireless network in such a way that it is unlikely that two or more systems would share a PSID.

In block 416, a provisioned talk group identifier (TGID) may be determined. When operating in the primary radio band, talk groups may be provisioned to determine which UE are able to communicate with other UE. For example, when utilizing PTT voice communication from a UE in a talk group, all other UE in that talk group will hear the voice communication.

In block 418, a modulo operation may be performed on the PSID and TGID according to the following equation:

$$\text{channel\_index}=(PSID*TGID)\% \text{ Channels\_In\_Set} \quad (\text{eq2})$$

By multiplying the PSID by the TGID, each talk group on the primary radio band is associated with a unique number. The modulo operation is an integer division that results in a remainder that varies from 0 to one less than the total number of Channels_In_Set. The result of the operation is that all talkgroups are evenly divided into a number of groups that is equal to the number of available channels.

Thus the talk groups can be evenly distributed amongst all available channels in the fallback radio band.

In block 421, a channel index may be selected based on the channel index that was determined in block 418. For example, if the PSID was 1,251, the TGID was 10, and the Channels_In_Set is 12, then the result of the modulo operation is 6. In block 424, the channel in the fallback radio band may be selected based on the channel index. For example, in the instant example, the result of the modulo operation was 6. In Table 1, channel index 6 corresponds to IBD Physical Channel Number 2022, which in turn corresponds to Frequency 456.31875 MHz (it should be noted that in the IBD band the frequency could have also been determined using eq1). As shown in Table 1, IBD physical channel 2022 operates in the 6.25 kHz mode and occupies TDMA slot 0. As should be clear, the selection of the channel in the fallback radio band was performed using operating parameters from the primary radio band, and did not require input from the user of the UE at the time of the switch to the fallback radio band.

In some fallback radio bands, parameters in addition to the channel may also be needed. For example, in the IBD band, UE are generally assigned a color code in order to reduce co-channel interference by different users assigned to the same channel. The number of available color codes may be referred to as Number_Available_Color_Codes. For example, in the IBD band, there are 15 available color codes. In block 427, a modulo operation may be performed on the PSID by the number of available color codes. For example, the following formula may be used:

$$\text{color\_code} = \text{PSID} \ \% \ \text{Number\_Available\_Color\_Codes} \quad (eq3)$$

The effect of this operation is to evenly distribute all possible PSID over the total number of available color codes. In the present example, all systems would be distributed over 15 available color codes, meaning that there is a 1 in 15 chance that two geographically co-located systems would be assigned the same color code. In the present example, if the PSID is 1,251 and the number of available color codes is 15, the result of the modulo operation is 6.

In block 430, a color code may be selected based on the result of the modulo operation on the PSID. As described above, in the present example, the result of the modulo operation was 6. Thus the $6^{th}$ color code in the list of available color codes in the IBP band may be selected. It should be understood that the number of available color codes is dependent on the particular fallback radio band. The techniques described herein are applicable regardless of the specific number of color codes available.

As mentioned above, the primary radio band may include talk group identifiers. The fallback radio band may also include talk group identifiers, but the ranges of those identifiers may not be the same as the range in the primary radio band. In block 436, the TGID may be mapped to a Fallback Talk Group Identifier (FB_TGID). The mapping process is described in more detail below.

In block 439, a floor operation may be performed on the result of PSID*TGID/Channels In Set. In block 442, a modulo operation may be performed on the result of the floor operation from block 439 by a number of available fallback talk group identifiers. The number of available fallback talk group identifiers may be based on the particular fallback radio band. For example, the number of available fallback talk group identifiers may be 0xFFFCDF (base 16). In block 445, the FB_TGID may be selected based on the remainder of the modulo operation on the result of the floor operation plus 1. For example, the following equation may be used to determine the FB_TGID:

$$FB\_TGID = \text{FLOOR}((PSID*TGID)/\text{Channels\_In\_Set}) \\ \% \text{ number available fallback talk group identifiers} + 1 \quad (eq4)$$

The result of the floor operation is to cause all PSID*TGID combinations that have the same integer quotient to be grouped. It should be noted that based on eq2, each of these combinations would be assigned to a different channel index. The modulo operation ensures that FB_TGID are evenly distributed amongst the available fall back talk group identifiers.

The fallback radio band may also require use of subscriber unit identifier (SUID) to uniquely identify each UE. In block 448, a SUID may be selected based on at least one portion of at least one provisioned system operating parameter. For example, each UE operating in the primary radio band may be provisioned with a IMSI. The IMSI may be used to determine a SUID for use in the fallback radio band.

In block 451, a modulo operation may be performed on the IMSI by a range of available SUID in the fallback radio band. In block 454, the SUID in the fallback radio band may be selected based on the remainder of the modulo operation on the IMSI. For example, the SUID may be determined according to the following equation:

$$SUID = IMSI \ \% \text{ number available fallback band} \\ SUID + 1 \quad (eq5)$$

The effect of eq5 is to evenly distribute all possible IMSI across all available SUID in the fallback radio band.

In block 457, a switch to the selected channel in the fallback radio band may occur. In block 460, the UE may directly communicate with other UE using the selected channel, using the selected color code, using the selected FB_TGID, and using the selected SUID. What should be understood is that communication in the fallback radio band may occur without requiring any reconfiguration of the UE by the user. All parameters necessary for communication in the fallback radio band were either configured in the UE at the time of initial provisioning (e.g. number of available channels in set in fallback band, number of available TGID in fallback band, number of available SUID in fallback band, number of available color codes in fallback band, etc.), were part of the provisioning of operation in the primary radio band (e.g. talk group management, IMSI), or were operational parameters of the primary radio band (e.g. TAC, IBN) that are available while operating in the primary radio band.

It should be understood that although the above example was presented in terms of the IBP radio band, the techniques described herein are not so limited. For example, by way of example, the same techniques could be used when using the Family Radio Service (FRS) as the fallback radio band. The FRS band provides a total of 15 channels that may be used at higher power (e.g. two watts) and 7 channels that are usable at a lower power. For purposes of this example, it may be assumed that only the higher power channels are utilized. Table 2 below indicates the available high power channels in the FRS band. Just as with Table 1, the information in Table 2 can be included when the UE is initially provisioned.

The FRS band only permits analog operation at 12.5 kHz and as such, several of the parameters shown in Table 1 are not necessary (e.g. operation mode, TDMA timeslot). Furthermore, aside from the channel, the only other operational parameter used in the FRS band is the private line (PL) code, which can also be referred to as tone squelch, when used as part of a continuous tone coded squelch system.

TABLE 2

Example IBP Authorized Channel List

| Channel Index | FRS Physical Channel | Frequency(MHz) |
|---|---|---|
| 0 | 1 | 462.5625 |
| 1 | 2 | 462.5875 |
| 2 | 3 | 462.6125 |
| 3 | 4 | 462.6375 |
| 4 | 5 | 462.6625 |
| 5 | 6 | 462.6875 |
| 6 | 7 | 462.7125 |
| 7 | 15 | 462.5500 |
| 8 | 16 | 462.5750 |
| 9 | 17 | 462.6000 |
| 10 | 18 | 462.6250 |
| 11 | 19 | 462.6500 |
| 12 | 20 | 462.6750 |
| 13 | 21 | 462.7000 |
| 14 | 22 | 462.7250 |

Initially, the total number of available FRS channels may be divided into a number of sets based on the desired reuse factor. For example, with a channel reuse factor of 3, the FRS channels may be divided into 3 groups, with 5 channels in each group. In general, the selected channel set may be determined using the following equation:

$$SelectedChannelSet = PSID \% \text{ Channel Reuse Factor} \quad (eq6)$$

Eq. 6 effectively maps each PSID to a selected channel set based on the reuse factor. So, if the reuse factor were 5, there would be 5 groups with 3 FRS channels in each group.

Once the channel set is selected, the channel within that set is selected. The channel may be selected according to the following equation:

$$SelectedChannelInSet = TGID \% \text{ Number of Channels in Set} \quad (eq7)$$

As explained above, selection of the channel reuse factor determines how many channels are in the set. Eq7 may be used to determine which of those channels in the set will be selected.

Once the channel set is selected, and the channel within the channel set is selected, the selection is converted into a channel index that can be used to identify a specific channel in Table 2. The channel index may be determined according to the following equation:

$$SelectedChannelIndex = \\ SelectedChannelInSet * \text{Channel reuse factor} + \\ SelectedChannelSet \quad (eq\ 8)$$

It should be noted that by using the above equations, the channel indexes are divided such that no adjacent channels are included in the same channel set. For example, with a reuse factor of three, there are 3 channel sets with 5 channels each created. Channel sets one {0,3,6,9,12}, two {1,4,7,10, 13) and three {2,5,8,11,14} are created, each including the channel indexes enclosed in brackets. As can be seen, no adjacent channels are included in a set, thus reducing the occurrence of cross channel interference of UE assigned to the same channel set.

By way of example, assume the channel reuse factor is 3, the PSID is 5, and the TGID is 13. Using eq6, the Select-edChannelSet is determined to be set 2. Using eq7, the SelectedChannelInSet is determined to be the third channel within the set (e.g. the third channel within the second channel set). Using eq8, the SelectedChannelIndex is determined to be 11. Referring to Table 2, it is shown that the channel index 11 corresponds to FRS channel 19, which in turn corresponds to a frequency of 462.6500 MHz, which will be the selected channel when operating in fallback mode for this talk group.

As mentioned above, the FRS also provides PL codes which can be used to reduce co-channel interference. The FRS band provides for 38 possible PL codes. Each PL code is associated with a particular frequency that is used within the tone coded squelch system. Due to the nature of the operation of tone coded squelch systems, it is beneficial to allocate PL codes from highest frequency to lowest frequency. The equations described below achieve this result.

Similarly to selecting a channel reuse factor, a PL code reuse factor may be selected. For example, the reuse factor selected may be 3, which results in 3 groups of PL codes, with the PL codes divided equally between each group. Just as above, the initial step may be to select one of the possible PL code sets, which may be done according to the following formula:

$$SelectedPL\_CodeSet = FLOOR\ (PSID/PL\ code\ reuse \\ factor)\ \%\ PL\ code\ reuse\ factor \quad (eq9)$$

The above equation is used to determine which set of PL codes should be selected.

Once the PL code set has been selected, a specific channel within that set may be selected according to the following equation:

$$SelectedPL\_CodeInSet = FLOOR(TGID/Number\ of \\ Channels\ in\ Set)\%Number\ of\ PL\ Codes\ in\ Set \quad (eq10)$$

Thus, eq10 is used to select which PL code amongst the PL codes in the selected set will be used.

Once the specific PL code within the set is determined, the selected PL code within the set may be converted to a PL code index using the following equation:

$$SelectedPL\_CodeIndex = Number\ of\ PL\ Codes - \\ (SelectedPL\_CodeInSet * PL\ code\ reuse\ factor + \\ SelectedPL\_CodeSet) - 1 \quad (eq11)$$

For example, assuming channel reuse and code reuse factors of 3, a PSID=5, and TGID=13, from eq9 the SelectedPL_CodeSet can be determined to be set 1. Using eq10, the SelectedPL)_CodeInSet can be determined to be 2. Using eq11, the SelectedPL_CodeIndex can be determined to be 30. The PL code index may be used to index a PL code table (not shown). The PL code table may simply be a list of the 38 available PL codes listed in frequency ascending order. The corresponding PL code associated with the index may be used as the PL code when operating on the specified talk group.

Figure 5:
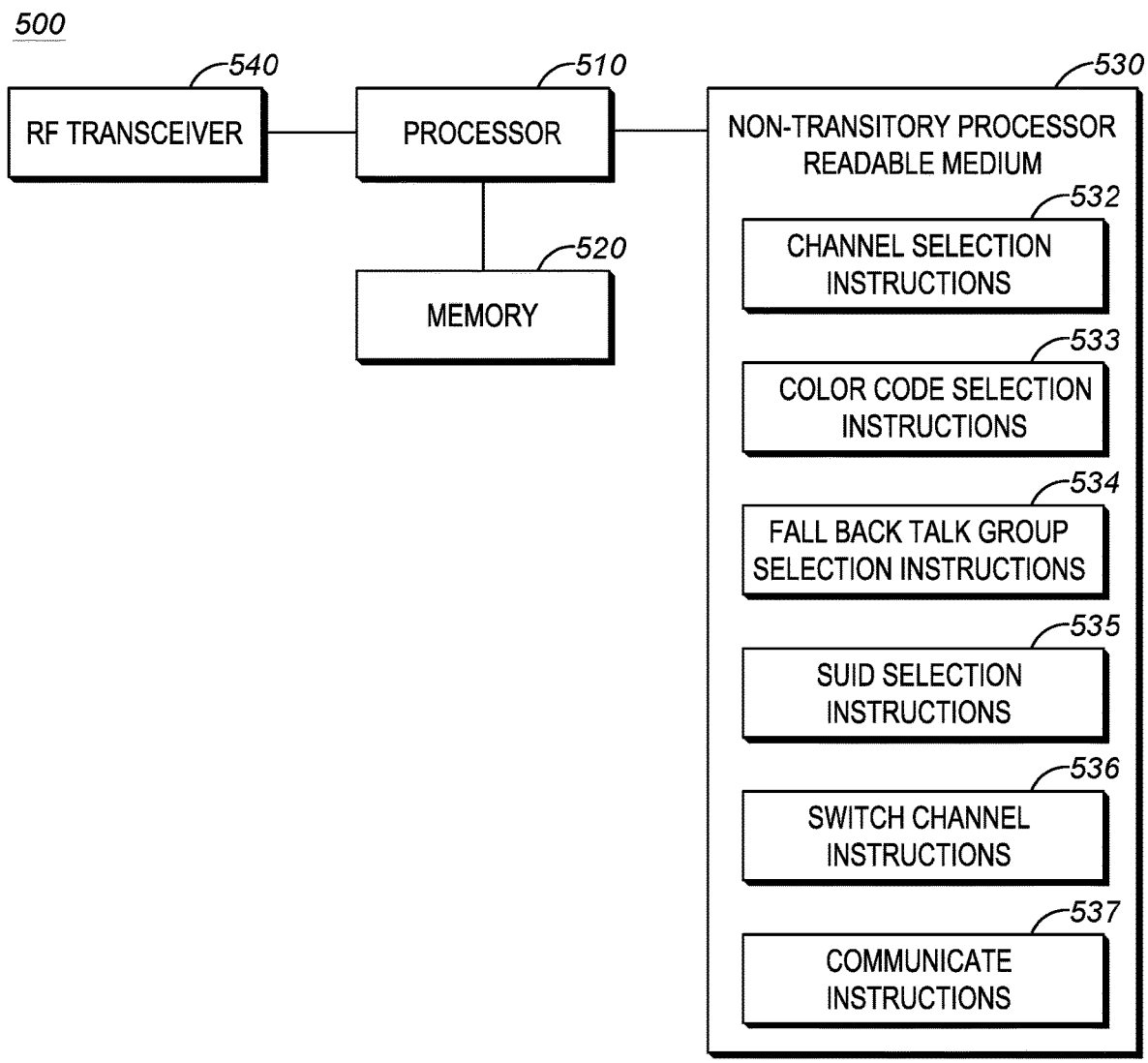
FIG. 5 is an example of a device and non-transitory processor readable medium that may implement the zero configuration direct fallback communications techniques described herein.

FIG. 5 is an example of a device and non-transitory processor readable medium that may implement the zero configuration direct fallback communications techniques described herein. Device 500 may be any type of deice that is able to communicate via RF in both a primary radio band and a fallback radio band. Examples of devices may include smartphones, two-way walkie talkies, tablets or other such devices equipped with wireless networking, or any other device including the capabilities described below.

Device 500 may include a processor 510. The processor may be coupled to a memory 520, a non-transitory processor readable medium 530, and a RF transceiver 540. The processor may execute instructions stored on the memory to implement the techniques described herein. For example, the processor may cause processor readable instructions from the non-transitory processor readable medium 530 to be stored in the memory and the processor may execute those instructions from the memory. In some implementations, the processor may execute the instructions directly from the non-transitory processor readable medium.

The non-transitory processor readable medium 530 may contain a set of instructions thereon. Those instructions, when executed, may cause the device 500 to implement the zero configuration direct fallback communications techniques described herein.

The medium 530 may include channel selection instructions 532, which may allow the device to select a channel in the fallback radio band based on at least a portion of at least one system operating parameter in a primary radio band. The instructions are generally described with respect to FIG. 4, blocks 406-424. The medium may include color code selection instructions 533, which are generally described with respect to FIG. 4, blocks 427 and 430.

The medium 530 may include fall back talk group selection instructions 534, which are generally described with respect to FIG. 4, blocks 433-445. The medium may also include SUID selection instructions 535, which are generally described with respect to FIG. 4, blocks 448-454. The medium may also include switch channel instructions 536, which are generally described with respect to FIG. 4, block 457. The medium may also include communicate instructions 537, which are generally described with respect to FIG. 4, block 460.

Device 500 may also include RF Transceiver 540. RF transceiver may be any combination of RF transmitter and receiver that is capable of at least half duplex voice communications using both a primary and fallback radio band. The techniques described herein are not limited to any specific implementation of the RF transceiver (e.g. discrete transmitter/receiver or integrated). Furthermore, RF transceiver may also include additional functionality in addition to capabilities. For example, capabilities may include full duplex voice communications, data communications, or any other type of RF communications. It should be understood that the techniques described herein are suitable for any device in which at least half duplex voice communication over a fallback radio band is available.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
selecting a channel in a fallback radio band based on at least a portion of at least one system operating parameter for a primary radio band;
determining at least a portion of a tracking area code (TAC);
determining at least a portion of an International Mobile Subscriber Identity (IMSI) Block Number (IBN);
combining the portion of the TAC and the portion of the IBN to create a Primary System Identifier (PSID);
determining a provisioned talk group identifier (TGID);
selecting the channel in the fallback radio band based on PSID*TGID;
switching to the selected channel in the fallback radio band; and
communicating over the selected channel in the fallback radio band.

2. The method of claim 1 wherein selecting the channel in the fallback radio band further comprises:
performing a modulo operation on the PSID*TGID by a number of channels in set value;
selecting a channel index based on a remainder determined by the modulo operation on the PSID*TGID; and
selecting the channel in the fallback radio band based on the channel index.

3. The method of claim 2 further comprising:
performing a modulo operation on the PSID by a number of available color codes;
selecting a color code based on a remainder of the modulo operation on the PSID; and
communicating on the selected channel using the selected color code.

4. The method of claim 3 wherein the number of available color codes is 15.

5. The method of claim 4 further comprising:
mapping the TGID to a fallback talk group identifier (FB_TGID).

6. The method of claim 5 wherein the mapping comprises:
performing a floor operation on PSID*TGID divided by the number of channels in set value (FLOOR[PSID*TGID/channels in set value]);
performing a modulo operation on a result of the floor operation by a number of available fallback talk group identifiers;
selecting the FB_TGID based on the remainder of the modulo operation on the result of the floor operation plus 1; and
communicating on the selected channel, using the selected color code, and using the selected FB_TGID.

7. The method of claim 6 further comprising:
selecting a subscriber user identifier (SUID) based on at least a portion of at least one provisioned system operating parameter.

8. The method of claim 7 wherein selecting the SUID comprises:
performing a modulo operation on the IMSI by a range of available SUID; and
selecting the SUID based on the remainder of the modulo operation on the IMSI.

9. A device comprising:
a wireless transceiver;
a processor; and
a memory coupled to the processor containing a set of instructions thereon that when executed by the processor cause the processor to:
select a channel in a fallback radio band based on at least a portion of at least one system operating parameter for a primary radio band;
switch to the selected channel in the fallback radio band; and
communicate over the selected channel in the fallback radio band.
determine at least a portion of a tracking area code (TAC);
determine at least a portion of an International Mobile Subscriber Identity (IMSI) Block Number (IBN);
combine the portion of the TAC and the portion of the IBN to create a Primary System Identifier (PSID);
determine a provisioned talk group identifier (TGID);
select the channel in the fallback radio band based on PSID*TGID;
switch to the selected channel in the fallback radio band; and
communicate over the selected channel in the fallback radio band.

10. The device of claim 9 wherein selecting the channel in the fallback radio band further comprises instructions to:
perform a modulo operation on the PSID*TGID by a number of channels in set value;
select a channel index based on a remainder determined by the modulo operation on the PSID*TGID; and
select the channel in the fallback radio band based on the channel index.

11. The device of claim 10 further comprising instructions to:
perform a modulo operation on the PSID by a number of available color codes;
select a color code based on a remainder of the modulo operation on the PSID; and
communicate on the selected channel using the selected color code.

12. The device of claim 11 wherein the number of available color codes is 15.

13. The device of claim 12 further comprising instructions to:
map the TGID to a fallback talk group identifier (FB_TGID).

14. The device of claim 13 further comprising instructions to:
perform a floor operation on PSID*TGID divided by the number of channels in set value (FLOOR[PSID*TGID/channels in set value]);
perform a modulo operation on a result of the floor operation by a number of available fallback talk group identifiers;
select the FB_TGID based on the remainder of the modulo operation on result of the floor operation plus 1; and
communicate on the selected channel, using the selected color code, and using the selected FB_TGID.

15. The device of claim 14 further comprising instructions to:
select a subscriber user identifier (SUID) based on at least a portion of at least one provisioned system operating parameter.

16. The device of claim 15 wherein selecting the SUID comprises instructions to:
   perform a modulo operation on the IMSI by a range of available SUID; and
   select the SUID based on the remainder of the modulo operation on the IMSI.

17. A non-transitory processor readable medium containing a set of instructions thereon that when executed by the processor cause the processor to:
   select a channel in a fallback radio band based on at least a portion of at least one system operating parameter for a primary radio band;
   determine at least a portion of a tracking area code (TAC);
   determine at least a portion of an International Mobile Subscriber Identity (IMSI) Block Number (IBN);
   combine the portions of the TAC and the IBN to create a Primary System Identifier (PSID);
   determine a provisioned talk group identifier (TGID); and
   select the channel in the fallback radio band based on the PSID*TGID;
   switch to the selected channel in the fallback radio band; and
   communicate over the selected channel in the fallback radio band.

* * * * *